United States Patent
Kim et al.

(10) Patent No.: US 12,333,203 B2
(45) Date of Patent: Jun. 17, 2025

(54) DISPLAY APPARATUS, MODULAR DISPLAY APPARATUS AND CONTROL METHOD THEREOF

(71) Applicant: SAMSUNG ELECTRONICS CO., LTD., Suwon-si (KR)

(72) Inventors: Sangwon Kim, Suwon-si (KR); Youngkook Kim, Suwon-si (KR); Jeongryeol Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 18/128,710

(22) Filed: Mar. 30, 2023

(65) Prior Publication Data

US 2023/0236787 A1 Jul. 27, 2023

Related U.S. Application Data

(63) Continuation of application No. PCT/KR2022/020900, filed on Dec. 20, 2022.

(30) Foreign Application Priority Data

Dec. 22, 2021 (KR) .................. 10-2021-0185466

(51) Int. Cl.
*G06F 3/14* (2006.01)
*H04N 21/422* (2011.01)
*H04N 21/485* (2011.01)

(52) U.S. Cl.
CPC ..... *G06F 3/1446* (2013.01); *H04N 21/42204* (2013.01); *H04N 21/4858* (2013.01)

(58) Field of Classification Search
CPC ............ G06F 3/1446; H04N 21/42204; H04N 21/4858
See application file for complete search history.

(56) References Cited

U.S. PATENT DOCUMENTS 9,524,092 B2 12/2016 Ren et al.
9,830,884 B2 11/2017 Choi et al.
(Continued)

FOREIGN PATENT DOCUMENTS

EP    2 693 424 B1    6/2020
JP    2008-281717 A   11/2006
(Continued)

OTHER PUBLICATIONS

International Search Report (PCT/ISA/210) issued Mar. 17, 2023 by the International Searching Authority in International Application No. PCT/KR2022/020900.
(Continued)

*Primary Examiner* — Clayton R Williams
(74) *Attorney, Agent, or Firm* — Sughrue Mion, PLLC

(57) ABSTRACT

A display apparatus included in a modular display apparatus includes a first communication interface configured to communicate with a remote control device; a second communication interface configured to communicate with an external device; a display; and a processor configured to: based on a control signal for displaying a user interface (UI) screen being received through the first communication interface, identify whether another display apparatus of the plurality of display apparatuses is connected to the external device based on configuration information of the modular display apparatus received from the external device through the second communication interface, based on identifying that the other
(Continued)

display apparatus is connected to the external device, transmit the control signal to the external device through the second communication interface, receive, from the external device through the second communication interface, the UI screen processed by the external device according to the control signal, and control the display to display at least a portion of the received UI screen.

20 Claims, 9 Drawing Sheets

(56) References Cited

U.S. PATENT DOCUMENTS

| | | | |
|---|---|---|---|
| 10,235,120 B2 | 3/2019 | Cho et al. | |
| 10,275,202 B2 | 4/2019 | Jo et al. | |
| 10,372,402 B1 | 8/2019 | Fitzgerald et al. | |
| 10,416,951 B2 | 9/2019 | Park | |
| 11,163,516 B2 | 11/2021 | Son | |
| 2009/0128524 A1* | 5/2009 | Young | G06F 3/1446 345/204 |
| 2015/0346987 A1 | 12/2015 | Ren et al. | |
| 2015/0348496 A1 | 12/2015 | Santos, II et al. | |
| 2016/0034242 A1* | 2/2016 | Cho | G06F 3/1446 345/1.3 |
| 2016/0062725 A1 | 3/2016 | Odagiri et al. | |
| 2016/0231975 A1* | 8/2016 | Kim | G06F 3/1446 |
| 2019/0392782 A1* | 12/2019 | Capt | G09G 5/14 |
| 2020/0348898 A1 | 11/2020 | Son | |

FOREIGN PATENT DOCUMENTS

| | | | |
|---|---|---|---|
| JP | 2011-257540 A | 12/2011 | |
| JP | 5510927 B2 | 6/2014 | |
| KR | 10-0642505 B1 | 11/2006 | |
| KR | 10-2016-0016523 A | 2/2016 | |
| KR | 10-2016-0076227 A | 6/2016 | |
| KR | 10-2017-0016338 A | 2/2017 | |
| KR | 10-2017-0055636 A | 5/2017 | |
| KR | 10-2010479 B1 | 8/2019 | |
| KR | 10-2021-0046757 A | 4/2021 | |
| KR | 10-2021-0073911 A | 6/2021 | |
| KR | 10-2304365 B1 | 9/2021 | |
| KR | 10-2435193 B1 | 8/2022 | |

OTHER PUBLICATIONS

Written Opinion (PCT/ISA/237) issued Mar. 17, 2023 by the International Searching Authority in International Application No. PCT/KR2022/020900.

Communication dated Nov. 4, 2024, issued by the European Patent Office in European Application No. 22911898.9.

* cited by examiner

1000

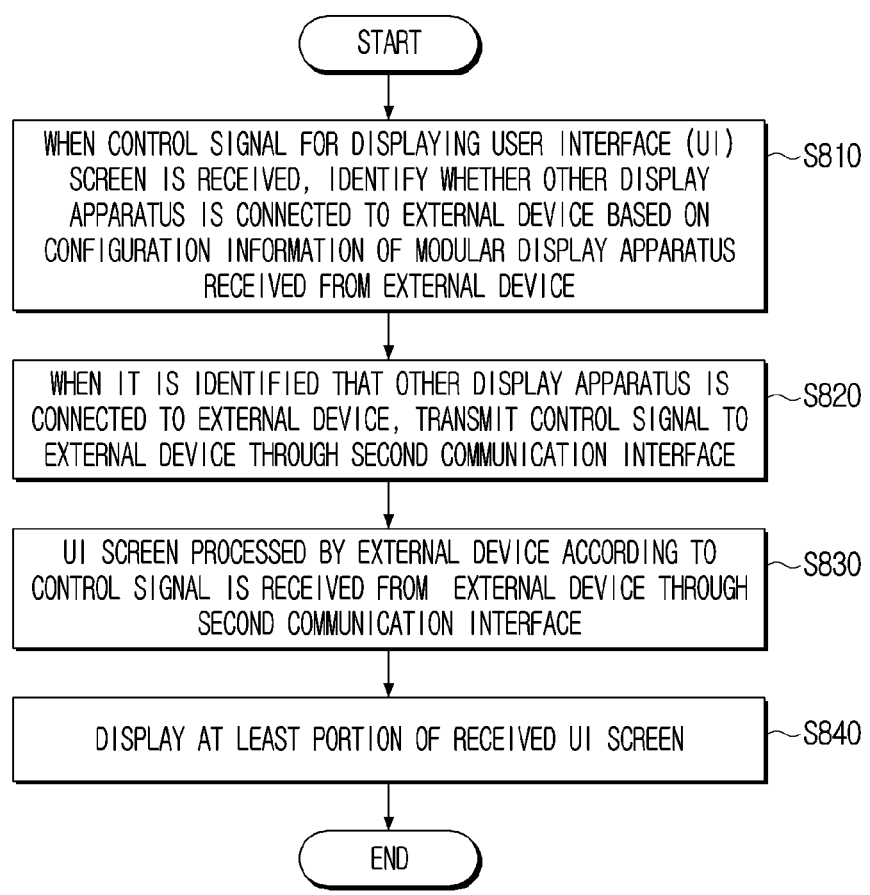

DISPLAY APPARATUS, MODULAR DISPLAY APPARATUS AND CONTROL METHOD THEREOF

CROSS-REFERENCE TO RELATED APPLICATION(S)

This application is a bypass continuation of International Application No. PCT/KR2022/020900, filed on Dec. 20, 2022, which is based on and claims priority to Korean Patent Application No. 10-2021-0185466, filed on Dec. 22, 2021, in the Korean Intellectual Property Office, the disclosures of which are incorporated by reference herein in their entireties.

BACKGROUND

1. Field

This disclosure relates to a display apparatus, a modular display apparatus, and a control method thereof for controlling display of a user interface screen.

2. Description of Related Art

Recently, various types of display systems, with varying display sizes and screen resolutions, have been developed and distributed.

As the size of the display system gets larger, and as the resolution of the display system gets higher, the number of display modules constituting the display system and the display apparatuses increases proportionally.

For a modular display apparatus, the size and shape of the modular display apparatus may be changed according to the number of display apparatuses constituting the modular display apparatus, the size of the display apparatus, and any other aspect of the display apparatuses.

When the modular display apparatus, receiving the control signal from the remote control device, displays a screen (e.g., a user interface (UI) screen) corresponding to the control signal, there is a problem in that only one of the plurality of display apparatuses (or a plurality of display modules) may display a screen corresponding to the control signal, or all of the plurality of display apparatuses may display a screen corresponding to the control signal, requiring a setting of each display apparatus to be changed one at a time.

As the number of display apparatuses is changed and the shape is changed, the screen size and shape of the modular display apparatus may be changed and thus, there is a necessity of a method of providing a screen (e.g., UI screen) that takes into account these changes.

SUMMARY

Provided are a display apparatus for displaying a screen corresponding to a screen size of a modular display apparatus, a modular display apparatus, and a control method thereof.

According to an aspect of the disclosure, provided a display apparatus included in a modular display apparatus composed of a plurality of display apparatuses, includes: a first communication interface configured to communicate with a remote control device; a second communication interface configured to communicate with an external device; a display; and a processor configured to: based on a control signal for displaying a user interface (UI) screen being received through the first communication interface, identify whether another display apparatus of the plurality of display apparatuses is connected to the external device based on configuration information of the modular display apparatus received from the external device through the second communication interface, based on identifying that the other display apparatus is connected to the external device, transmit the control signal to the external device through the second communication interface, receive, from the external device through the second communication interface, the UI screen processed by the external device according to the control signal, and control the display to display at least a portion of the received UI screen.

A combination of each display of each display apparatus of the plurality of display apparatuses in the modular display apparatus may form a composite modular screen, and the UI screen received from the external device may be processed so as to correspond to a size of the composite modular screen.

The UI screen may include an on screen display menu to adjust a setting value of the plurality of display apparatuses constituting the modular display apparatus.

The processor may be further configured to, based on identifying that the other display apparatus is not connected to the external device, control the display to display an entire portion of the UI screen corresponding to the control signal.

The configuration information of the modular display apparatus may include location information of the display apparatus within the modular display apparatus, and the processor may be further configured to control the display to display at least the portion of the UI screen corresponding to the location information of the display apparatus in the modular display apparatus.

The processor may be further configured to, based on the first communication interface being inactivated based on the configuration information of the modular display apparatus, control the display to display the UI screen received from the external device through the second communication interface, and the UI screen may be processed by the external device as the other display apparatus transmits the control signal received from the remote control device to the external device.

The processor may be further configured to receive from the external device a content signal received by the other display apparatus from a source device.

According to an aspect of the disclosure, a modular display apparatus includes: a plurality of display apparatuses; and a control device configured to communicate with each of the plurality of display apparatuses, wherein at least one display apparatus of the plurality of display apparatuses is configured to transmit a control signal received from a remote control device to the control device, and wherein the control device is further configured to: based on a control signal to display a user interface (UI) screen being received from the at least one display apparatus, process UI data corresponding to the control signal based on configuration information of the modular display apparatus and obtain the processed UI screen, and transmit the processed UI screen to each display apparatus of the plurality of display apparatuses.

A combination of each display of each display apparatus of the plurality of display apparatuses in the modular display apparatus may form a composite modular screen, and the UI screen received from the control device may be processed to correspond to a screen size of the composite modular screen.

The UI screen may include an on screen display menu to adjust a setting value of the plurality of display apparatuses constituting the modular display apparatus.

The UI screen may be processed such that each display apparatus of the plurality of display apparatuses displays a different portion of the UI screen.

The configuration information may include location information of each display apparatus of the plurality of display apparatuses, and the different portion of the UI screen displayed in each display apparatus of the plurality of display apparatuses may be based on the location information.

The control device may be further configured to communicate independently with each display apparatus of the plurality of display apparatuses.

The control device may be further configured to transmit a content signal received from a source device to each display apparatus of the plurality of display apparatuses.

According to an aspect of the disclosure, a control method of a display apparatus included in a modular display apparatus composed of a plurality of display apparatuses, includes: based on a control signal for displaying a user interface (UI) screen being received through a first communication interface of the display apparatus, identifying whether another display apparatus is connected to an external device based on configuration information of the modular display apparatus received from the external device through a second communication interface of the display apparatus; based on identifying that the other display apparatus is connected to the external device, transmitting the control signal to the external device through the second communication interface; receiving, from the external device through the second communication interface, the UI screen processed by the external device according to the control signal; and displaying, by a display of the display apparatus, at least a portion of the received UI screen.

A combination of each display of each display apparatus of the plurality of display apparatuses in the modular display apparatus may form a composite modular screen, and the UI screen received from the external device may be processed so as to correspond to a size of the composite modular screen.

The UI screen may include an on screen display menu to adjust a setting value of the plurality of display apparatuses constituting the modular display apparatus.

The method may further include, based on identifying that the other display apparatus is not connected to the external device, displaying an entire portion of the UI screen corresponding to the control signal.

The configuration information of the modular display apparatus may include location information of the display apparatus within the modular display apparatus, and the displaying may include displaying at least a portion of the UI screen corresponding to the location information of the display apparatus in the modular display apparatus.

The method may further include: deactivating, based on the configuration information of the modular display apparatus, the first communication interface such that the control signal transmitted by a remote control device is not received through the first communication interface, the displaying may include displaying the UI screen received from the external device, and the UI screen is processed by the external device as the other display apparatus transmits the control signal received from the remote control device to the external device.

According to one or more embodiments of the disclosure, it is possible to provide a UI screen considering the screen size of the modular display apparatus, thereby increasing user manipulation convenience for the modular display apparatus.

According to various one or more embodiments of the disclosure, in a modular display apparatus including a plurality of display apparatuses, by using a control signal received from any one of a plurality of display apparatuses, a module display apparatus may provide one unified UI screen, thereby increasing user manipulation convenience for the modular display apparatus.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a flowchart illustrating a method of controlling a display apparatus according to an embodiment.

DETAILED DESCRIPTION

Figure 1A:
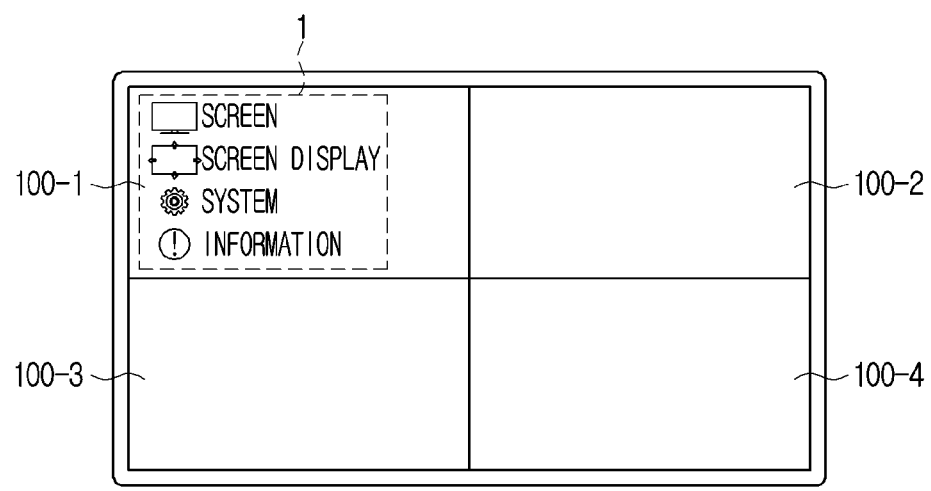
FIG. 1A is a diagram illustrating a UI displayed by a related-art modular display apparatus.
Figure 1A:
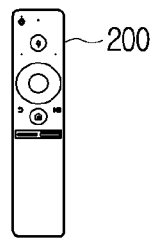

After terms used in the present specification are briefly described, embodiments of the present disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be modified and have several embodiments, specific embodiments of the disclosure will be illustrated in the drawings and be described in detail in the detailed description. However, it is to be understood that the disclosure is not limited to specific exemplary embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In exemplary embodiments of the present disclosure, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

FIG. 1A is a diagram illustrating a UI displayed by a related-art modular display apparatus.

Referring to FIG. 1A, a modular display apparatus 1000 may be composed of a plurality of display apparatuses 100-1 to 100-n. The modular display apparatus 1000 may display a video signal using a plurality of display apparatuses 100-1 to 100-n. The modular display apparatus 1000 may be implemented as a TV, but is not limited thereto and may be implemented as various types of apparatuses including a display function, such as a video wall, large format display (LFD), a digital signage, digital information display (DID), projector display, or any other display apparatus known to one of ordinary skill in the art. The modular display apparatus 1000 may be implemented as a display of various types such as, for example, and without limitation, a liquid crystal display (LCD), organic light emitting diodes (OLED), liquid crystal on silicon (LCoS), digital light processing (DLP), quantum dot (QD) display panel, quantum dot light-emitting diodes (QLED), or any other display type known to one of ordinary skill in the art.

The modular display apparatus 1000, for example, may include a plurality of display apparatuses (or modules) 100-1 to 100-n. For example, as shown in FIG. 1, a plurality of display apparatuses 100-1 to 100-n may be combined to implement one display apparatus (e.g., the display system 1000). Each of the plurality of display apparatuses 100-1 to 100-n may include a plurality of self-emitting devices. Here, the self-emitting device may be at least one of a light emitting diode (LED) or a micro LED.

Each of the plurality of display apparatuses 100-1 to 100-n may be implemented as an LED cabinet including a plurality of LED elements. The LED elements may be implemented with an RGB LED, where the RGB LED may include a red LED, a green LED, and a blue LED. The LED element may further include a white LED in addition to the RGB LED.

According to some embodiments, the LED element may be implemented with a micro LED. The micro LED may include a micro-size light emitting element of 5-100 micrometers, which emits light by itself without a color filter.

According to some embodiments of the disclosure, each of the plurality of display apparatuses 100-1 to 100-n constituting the modular display apparatus 1000 may be connected to an external device (e.g., a control device, a source device, etc.), and may receive a control signal, a video signal, a sound signal, and the like from an external device.

As another example, each of the plurality of display apparatuses 100-1 to 100-n included in the modular display apparatus 1000 may be connected to each other. For example, at least one display apparatus receiving a control signal, a video signal, a sound signal, etc. from a source device, may transmit a received control signal, a video signal, a sound signal, etc. to another display apparatus connected in series with the display apparatus, and accordingly, a control signal, a video signal, a sound signal, and any other signal known to one of ordinary skill in the art may be sequentially transmitted to all the plurality of display apparatuses 100-1 to 100-n.

In some embodiments, as the resolution, size, etc. of the modular display apparatus 1000 increases, the number of the plurality of display apparatuses 100-1 to 100-n provided in the modular display apparatus 1000 also increases proportionally. Due to these factors, a communication connection relationship between the plurality of display apparatuses 100-1 to 100-n (e.g., how each of the plurality of display apparatuses 100-1 to 100-n receives a control signal, a video signal, and a sound signal, etc., from an external device or any other device) may be deformed in addition to the related-art communication connection relationship (e.g., daisy chain communication relationship), receiving method, or any other communication connection relationship known to one of ordinary skill in the art.

When a related-art modular display apparatus 1000 including a plurality of display apparatuses 100-1 to 100-n displays a user interface (UI) screen, only one (e.g., first display apparatus 100-1) of the plurality of display apparatuses 100-1 to 100-n may display the UI screen 1, or all the plurality of display apparatuses 100-1 to 100-n may display the UI screen 1. As such, there is a significant problem that a resized (or upscaled) UI screen 1 is not displayed in consideration of the number, screen size, or screen resolution of the plurality of display apparatuses 100-1 to 100-n constituting the modular display apparatus 1000.

For example, referring to FIG. 1A, only a first display apparatus 100-1 of the plurality of display apparatus 100-1 to 100-n may receive a control signal from a remote control device 200, and only the first display apparatus 100-1 that receives the control signal may display the UI screen 1, where the remaining display apparatus 100-2 to 100-n may not display the UI screen 1. The UI screen 1, displayed on the first display apparatus 100-1, may include an On Screen Display (OSD) menu for adjusting the setting value of the display apparatus 100. As understood by one of ordinary skill in the art, the UI screen 1 is not limited to these settings and may include any other information relevant to the modular display apparatus 1000.

According to FIG. 1A, the setting value of the first display apparatus 100-1 may be adjusted according to the operation on the UI screen 1, and the setting value of the remaining display apparatus 100-2 to 100-n may not be adjusted. Therefore, in order to adjust all the setting values of each of the plurality of display apparatuses 100-1 to 100-n constituting the related-art modular display apparatus 1000, the user is significantly inconvenienced by having to repeatedly transmit the control signals using the remote control device 200 to adjust the settings on the other display apparatuses.

Figure 1B:
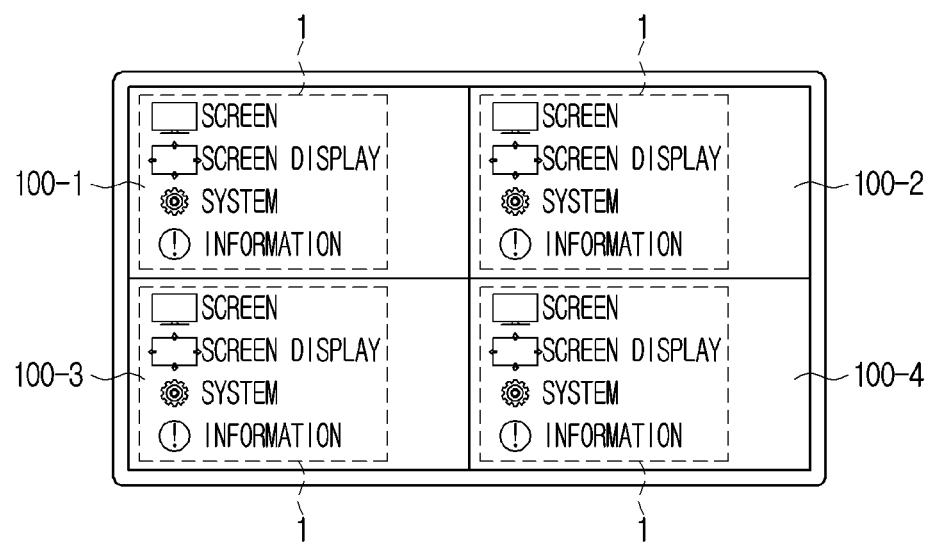
FIG. 1B is a diagram illustrating a UI displayed by a related-art modular display apparatus.
Figure 1B:
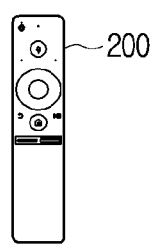

FIG. 1B is a diagram illustrating a UI displayed by a related-art modular display apparatus.

As another example, referring to FIG. 1B, each of a plurality of display apparatuses 100-1 to 100-n may receive a control signal from the remote control device 200, and each of the plurality of display apparatuses 100-1 to 100-n receiving the control signal may display the UI screen 1.

Since the modular display apparatus 1000 consisting of the plurality of display apparatuses 100-1 to 100-n does not display a single UI screen 1, but rather each of a plurality of display apparatuses 100-1 to 100-n displays the UI screen 1 separately (e.g., the user is provided with a plurality of UI screens 1 the user is significantly inconvenienced by having to repeatedly transmit the control signals using the remote control device 200 to adjust the settings on each of the display apparatuses. For example, the user is required to operate the remote control device 200 to adjust each setting value uniformly (or equally) on each of the plurality of display apparatuses 100-1 to 100-n.

Since all of the plurality of display apparatuses 100-1 to 100-n receive the control signal, it is significantly inconvenient for the user to adjust only the setting value of a specific display apparatus at a time (e.g., the first display apparatus 100-1) using the remote control device 200.

The modular display apparatus 1000, according to some embodiments of the disclosure, may display one UI screen 1 that has been resized (or upscaled) in consideration of the number, screen size, screen resolution, etc. of the plurality of display apparatuses 100-1 to 100-n constituting the modular display apparatus 1000. A detailed description is provided with reference to FIG. 2.

Figure 2:
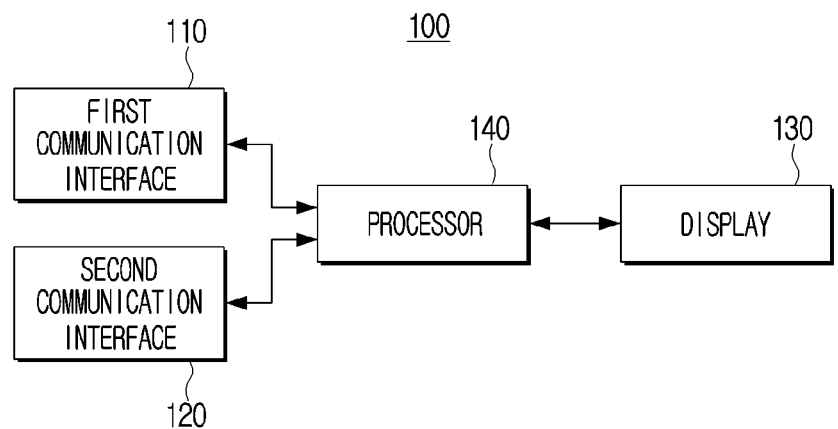
FIG. 2 is a block diagram illustrating a configuration of a display apparatus, according to an embodiment.

FIG. 2 is a block diagram illustrating a configuration of a display apparatus according to an embodiment.

Referring to FIG. 2, the display apparatus 100 may include a first communication interface 110, a second communication interface 120, a display 130, and a processor 140.

The display apparatus 100, according to some embodiments of the disclosure, may be one of a plurality of display apparatuses 100-1 to 100-n constituting a modular display apparatus 1000 (e.g., a display system), may be implemented as an independent display apparatus 100, or may include a plurality of display modules.

Hereinafter, for convenience of description, the modular display apparatus 1000 includes a plurality of display apparatuses 100-1 to 100-n, and each of the plurality of display apparatuses 100-1 to 100-n may include a first communication interface 110, a second communication interface 120, the display 130, and the processor 140.

The first communication interface 110, according to some embodiments, may communicate with the remote control device 200.

The first communication interface 110 may receive various signals and data. For example, the first communication interface 110 may communicate with at least one remote control device 200 associated with the modular display apparatus 1000 through various communication methods using radio frequency (RF), infrared (IR), or any other wireless communication medium known to one of ordinary skill in the art, through various communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MEL), audio engineering society (AES)/European broadcasting union (EBU), optical, coaxial, near field communication (NFC), or any other communication method known to one of ordinary skill in the art, and may receive, from the remote control device 200, a control signal to control the display apparatus 100 or the modular display apparatus 1000 composed of a plurality of display apparatuses 100-1 to 100-n.

The control signal may be received from the remote control device 200 through the first communication interface 110, and may also be received through a user interface provided in the display apparatus 100.

The user interface may include a button, a microphone, and any other input device known to one of ordinary skill in the art. When the user interface is implemented, the display apparatus 100 may receive a user voice command through the microphone and may identify a control signal corresponding to the user voice command.

The second communication interface 120, according to some embodiments, may communicate with an external device.

The second communication interface 120, according to some embodiments, may receive various signals and data. For example, the second communication interface 120 may communicate with at least one external device associated with the modular display apparatus 1000 through various communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), audio engineering society (AES)/European broadcasting union (EBU), optical, coaxial, near field communication (NFC), or any other communication method known to one of ordinary skill in the art. The second communication interface 120 may communicate with the external device in accordance with standards between the display apparatus 100 and the external device, and may receive, from the external device, a control signal to control the display apparatus 100 or the modular display apparatus 1000 composed of a plurality of display apparatuses 100-1 to 100-n, video data, sound data, or any other feature of the modular display apparatus 1000.

Here, the external device may be connected to each of the plurality of display apparatuses 100-1 to 100-n constituting the modular display apparatus 1000, and may provide control signals, video data, sound data, etc. to each of the plurality of display apparatuses 100-1 to 100-n, and may power each of the plurality of display apparatuses 100-1 to 100-n.

For example, the external device may itself act as a source device to provide a content signal to each of the plurality of display apparatuses 100-1 to 100-n, and the external device may communicate with a separate source device to provide a content signal received from the source device to each of the plurality of display apparatuses 100-1 to 100-n.

The external device, according to some embodiments may be connected to an outlet located on a wall by wire and may supply drive power to each of the plurality of display apparatuses 100-1 to 100-n.

The display apparatus 100, according to some embodiments, may provide various images by controlling the display 130. The images may include a still image and a moving image, or a portion of an image provided by the modular display apparatus 1000 composed of the plurality of display apparatuses 100-1 to 100-n. For example, as each of the plurality of display apparatuses 100-1 to 100-n provides different portions (or parts) of an image, the modular display apparatus 1000 may provide one image. For example, the first display apparatus 100-1 among a plurality of display apparatuses 100-1 to 100-n may obtain location information of the first display apparatus 100-1 in the modular display apparatus 1000, and may provide a portion corresponding to the location information in the image. In this regard, if the first display apparatus 100-1 is in the top left corner of the modular display apparatus 1000, the first display apparatus 100-1 may display a top left corner of an image. This process may be repeated for the remaining display apparatuses in the modular display apparatus 1000.

The display 130 may be implemented as a display including a self-emitting element or a display including a non-self-limiting element and a backlight. For example, the display 130 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or any other display type known to one of ordinary skill in the art. In the display 130, a backlight unit, a driving circuit which may be implemented as an a-si thin film transistor (TFT), low temperature poly silicon (LTPS) TFT, organic TFT (OTFT), or any other thin film transistor structure known to one of ordinary skill in the art, may also be included. The display 130 may be implemented as a touch screen coupled to a touch sensor, a flexible display, a rollable display, a third-dimensional (3D) display, a display in which a plurality of display modules are physically connected, or any other display type known to one of ordinary skill in the art.

The processor 140 may be electrically connected to a memory and may control overall operations of the display apparatus 100.

The processor 140, according to some embodiments, may be implemented with, for example, and without limitation, a digital signal processor (DSP) for image-processing of a digital image signal, a microprocessor, a time controller (TCON). As understood by one of ordinary skill in the art, these processors are only examples, and the processor may include, for example, and without limitation, one or more among a central processor (CPU), a micro controller unit (MCU), a microprocessor (MPU), a controller, an application processor (AP), a communication processor (CP), an advanced reduced instruction set computing (RISC) machine (ARM) processor, an artificial intelligence (AI) processor, or may be defined as a corresponding term. The processor 140 may be implemented in a system on chip (SoC) type or a large scale integration (LSI) type, in which a processing algorithm may be built therein, application specific integrated circuit (ASIC), or in a field programmable gate array (FPGA) type. The processor 140 may perform various functions by executing computer executable instructions stored in the memory 130.

The processor 140, according to some embodiments, may control the display 110 to display an image.

When a control signal for displaying the UI screen 1 via the first communication interface 110 is received from the remote control device 200, the processor 140, according to some embodiments of the disclosure, may identify whether another display apparatus 100 is connected to an external device based on the configuration information of the modular display apparatus 1000 received from the external device via the second communication interface 120.

The configuration information of the modular display apparatus 1000, configured with a plurality of display apparatuses 100-1 to 100-n, may include the number of plurality of display apparatuses 100-1 to 100-n constituting the modular display apparatus 1000, the size and resolution of each of the plurality of display apparatuses 100-1 to 100-n, location information of each of the plurality of display apparatuses 100-1 to 100-n in the modular display apparatus 1000, and information regarding the size and resolution of the modular display apparatus 1000, and the like. Each of the display apparatuses 100-1 to 100-n may have the same display size, or different display sizes. A combination of each display screen of display apparatuses 100-1 to 100-n may form a composite modular screen. For example, each of the screens may be combined to form a composite modular screen such that each screen displays a different portion of the UI screen 1.

The processor 140, according to some embodiments may, based on identifying that another display apparatus 100' is connected to an external device, transmit the control signal received from the remote control device 200 to the external device via the second communication interface 120. The display apparatus 100' may corresponding to any one of display apparatuses 100-1 to 100-n of the modular display apparatus 1000.

If the processor 140 identifies that the display apparatus 100 constituting the modular display apparatus 1000 as being a plurality of individual displays rather than one, the processor 140 may transmit the control signal received from the remote control device 200 to an external device via the second communication interface 120.

The processor 140 may receive the UI screen 1 processed by the external device through the second communication interface 120 as a control signal is transmitted to the external device.

The UI screen 1 processed by the external device may refer to a screen in which the external device resized the size of the UI screen 1 or upscaled the resolution of the UI screen 1 based on the number of plurality of display apparatuses 100-1 to 100-n connected to the external device, the size and resolution of the modular display apparatus 1000 composed of the plurality of display apparatuses 100-1 to 100-n, etc.

When the processed UI screen 1 processed by the external device is received, the processor 140 may control the display 130 to display the UI screen 1. A detailed description thereof is made with reference to FIG. 3.

Figure 3:
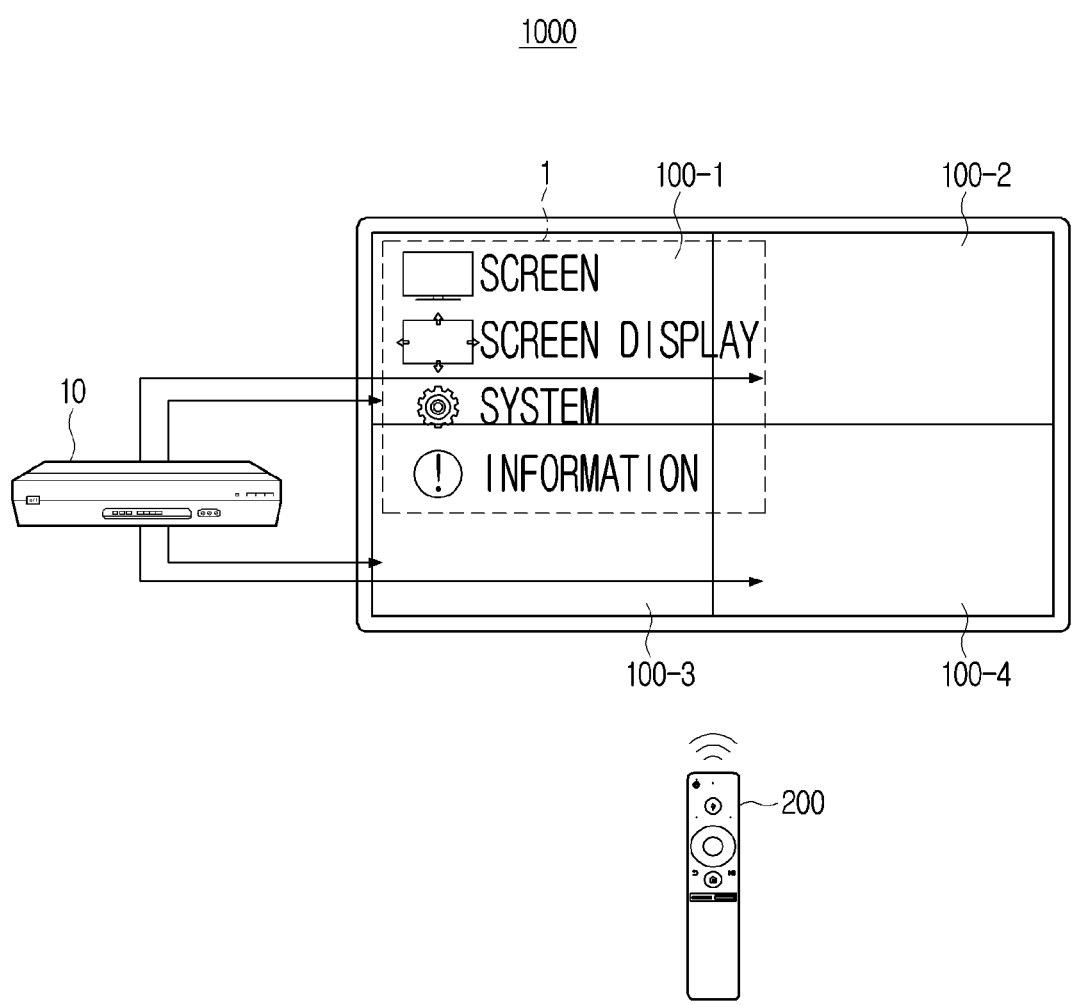
FIG. 3 is a diagram illustrating a UI displayed by a modular display apparatus according to an embodiment.

FIG. 3 is a diagram illustrating a UI displayed by a modular display apparatus, according to an embodiment.

Referring to FIG. 3, the processor 140 may receive the UI screen 1 from the external device 10 and control the display 130 to display the received UI screen 1.

When the processor 140 receives a control signal from the remote control device 200 for displaying the UI screen 1 through the first communication interface 110, the processor 140 may identify whether the display apparatus 100 constituting the modular display apparatus 1000 is one or plural.

The processor 140 may then transmit a control signal to the external device 10 via the second communication interface 120 when the display apparatus 100 constituting the modular display apparatus 1000 is plural, or when another display apparatus 100' is connected to the external device 10. The display apparatus 100 may correspond to display apparatus 100-1, and the another display apparatus 100' may correspond to at least one of display apparatus 100-2, 100-3, and 100-4.

When the external device 10 receives a control signal from the display apparatus 100, the external device 10 may process the UI screen 1 based on the configuration information of the modular display apparatus 1000 configured with a plurality of display apparatuses 100-1 to 100-*n*. For example, the external device 10 may process (e.g., enlarge or upscale), the UI screen 1 to correspond to the screen size of the modular display apparatus 1000, including the display apparatus 100 (e.g., the first display apparatus 100-1 in FIG. 3) and other display apparatus 100' (e.g., the second to the fourth display apparatus 100-2, 100-3, 100-4 in FIG. 3).

The external device 10 may transmit the processed UI screen 1 to each of the plurality of display apparatuses 100-1 to 100-*n*.

For example, the external device 10 may transmit the entire processed UI screen 1 to a plurality of display apparatuses 100-1 to 100-*n*, respectively. The display apparatus 100 may subsequently display a portion of the UI screen 1 processed based on the location information of the display apparatus 100 within the modular display apparatus 1000, which may be configured with a plurality of display apparatus 100-1 to 100-*n*.

For example, as each of the plurality of display apparatuses 100-1 to 100-*n* display different portions (or parts) of the processed UI screen 1, the modular display apparatus 1000 may display one UI screen 1, where the UI screen 1 may be spread across multiple displays.

In another example, the external device 10 may divide the processed UI screen 1 based on the configuration information, and provide different portions (or parts) of the UI screen 1 to each of the display apparatuses 100-1 to 100-*n*. For example, as each of the display apparatus 100-1 to 100-*n* displays a different portion (or part) of the UI screen 1, the modular display apparatus 1000 consisting of the plurality of display apparatuses 100-1 to 100-*n* may display one UI screen 1.

Referring to FIG. 3, since the modular display apparatus 1000 displays one UI screen 1, the plurality of display apparatuses 100-1 to 100-*n* constituting the modular display apparatus 1000 may be controlled simultaneously (or at once) using the remote control device 200.

For example, the modular display apparatus 1000 may display an OSD menu to adjust the setting value of the plurality of display apparatuses 100-1 to 100-*n*, and when the control signal for the OSD menu is received from the remote control device 200, the external device 10 may adjust the setting value of each of the plurality of display apparatuses 100-1 to 100-*n* based on the control signal for the OSD menu.

Here, the OSD menu displayed by the modular display apparatus 1000 composed of a plurality of display apparatuses 100-1 to 100-*n* may be an OSD menu processed (e.g., enlarged) by the external device 10 so as to correspond to the screen size of the modular display apparatus 1000. In some embodiments, the modular display apparatus 1000 is configured to display multiple UI screens simultaneously.

Figure 4:
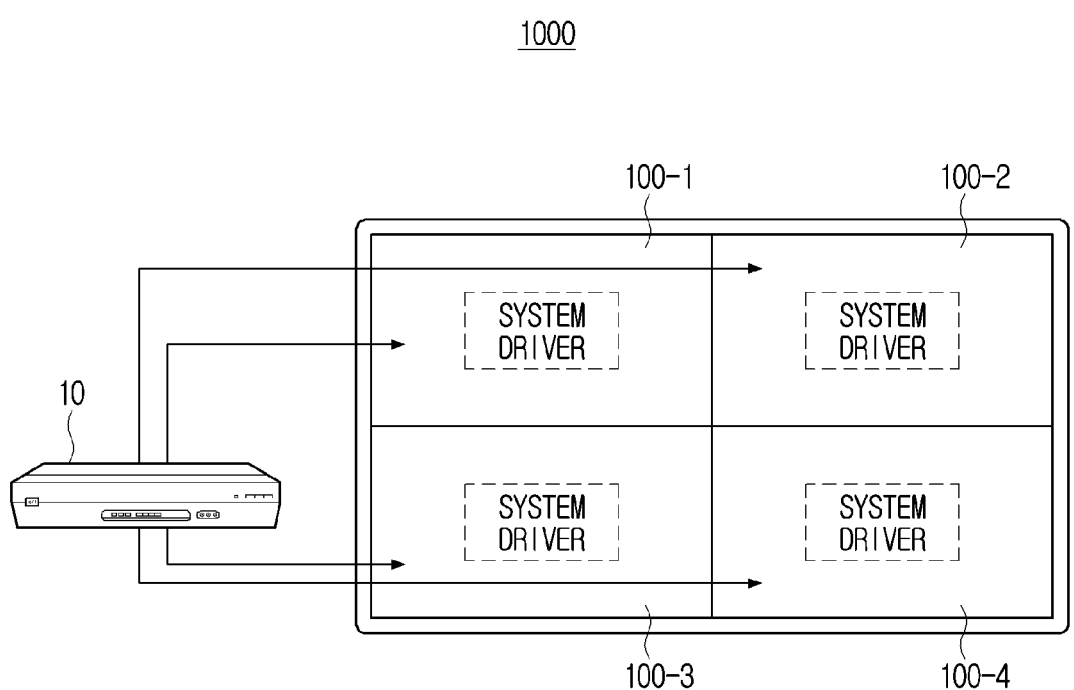
FIG. 4 is a diagram illustrating a system driver provided in each of a plurality of display apparatuses according to an embodiment.

FIG. 4 is a diagram illustrating a system driver provided in each of a plurality of display apparatuses, according to an embodiment.

Referring to FIG. 4, each of the plurality of display apparatuses 100-1 to 100-*n* constituting the modular display apparatus 1000 may include a system driver. The system driver is a name for convenience of description and may be referred to as a driving board, or any other term known to one of ordinary skill in the art for a system driver.

According to some embodiments of the disclosure, each of the plurality of display apparatuses 100-1 to 100-*n* constituting the modular display apparatus 1000 may communicate with the external device 10.

In FIG. 4, a plurality of display apparatuses 100-1 to 100-*n* are connected to the external device 10, however, this configuration is merely an example, and is not limited thereto. As another example, the first display apparatus 100-1 among the plurality of display apparatuses 100-1 to 100-*n* may be connected to the external device 10, and the signal and data provided by the external device 10 may be sequentially provided to remaining display apparatuses 100-2 to 100-*n* through the first display apparatus 100-1.

In some embodiments, the plurality of display apparatuses 100-1 to 100-*n* may be connected by a daisy chain method.

Figure 5:
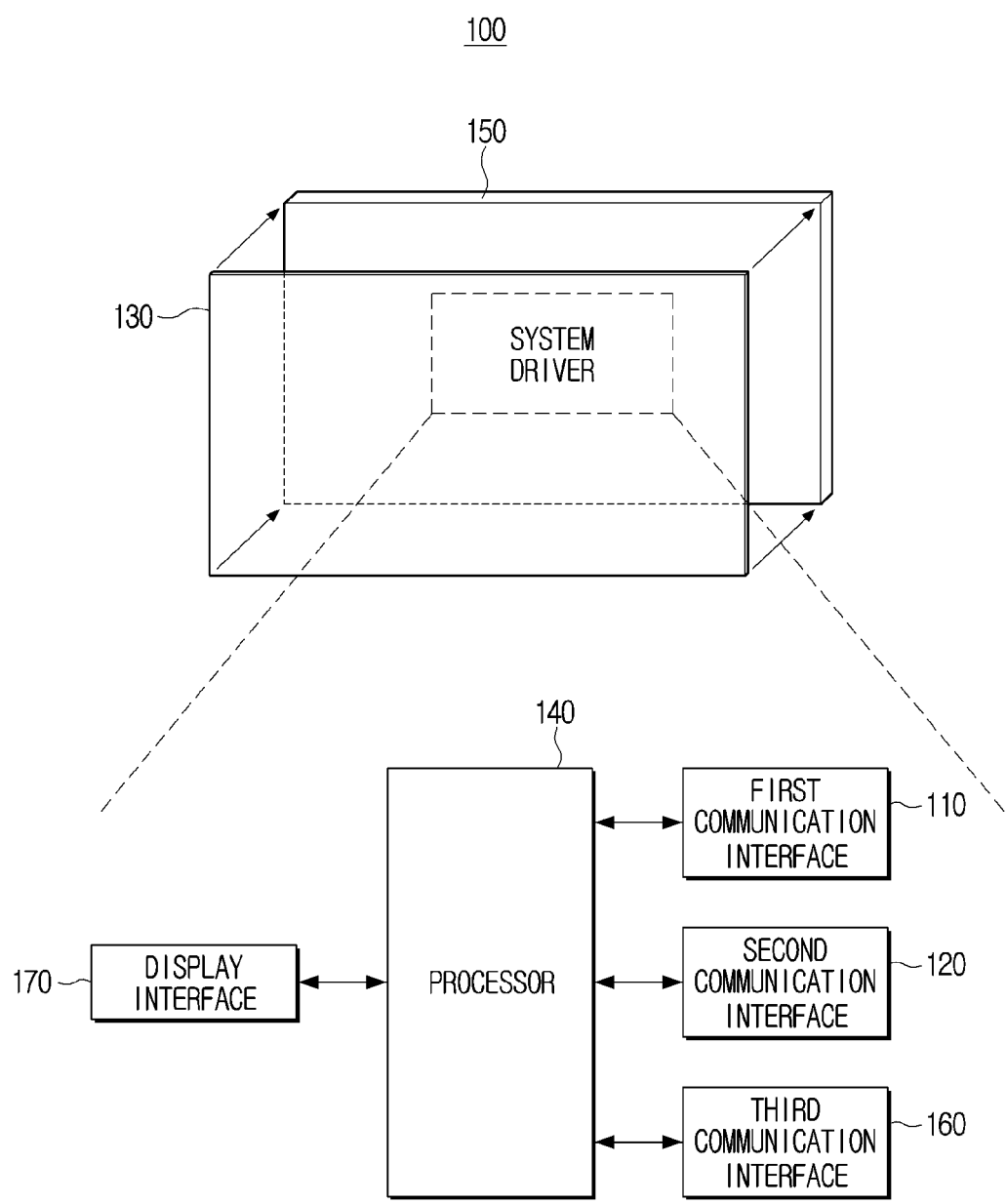
FIG. 5 is a diagram illustrating a system driver in detail according to an embodiment.

FIG. 5 is a diagram illustrating a system driver in detail, according to an embodiment.

Referring to FIG. 5, the system driver may include the first communication interface 110, the second communication interface 120, the processor 140, a third communication interface 160, and a display interface 170, and the display apparatus 100 may include a frame 150 in which the display 130 may be mounted and supported.

The system driver may be provided in one region of the frame 150, according to some embodiments.

A duplicate description of the configuration described with reference to FIG. 2 among the configurations included in the system driver will be omitted.

According to some embodiments of the disclosure, the display 130 and the frame 150 may be detachable, and the frame 150 may include a space in which the display 130 may be mounted and supported. The size of the frame 150 may correspond to the size of the display 130.

As another example, the size of the frame 150 may correspond to the size of the modular display apparatus 1000 composed of the plurality of display apparatuses 100-1 to 100-*n*, and a plurality of spaces, each of which may be mounted and supported, may be provided.

The third communication interface 160, according to some embodiments, receives various signals and data. For example, the third communication interface 160 may communicate with at least one source device (e.g., source device provided in a house) through various communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MEL), audio engineering society (AES)/European broadcasting union (EBU), optical, coaxial, near field communication (NFC), or any other communication method known to one of ordinary skill in the art.

For example, if the second communication interface 120 uses a communication scheme according to a customized standard, as opposed to a commonly used standard, between the display apparatus 100 and the external device 10, the third communication interface 160 may use a communication scheme according to the customized standard.

According to some embodiments of the disclosure, the second communication interface 120 may be used as an exclusive communication interface connectable only to an external device 10, and the third communication interface 160 may be used as a universal communication interface connectable to devices (e.g., a set-top box, etc.) using a communication scheme according to various standard specifications. However, this configuration is merely an example and is not limited thereto. If the second communication interface 120 is an exclusive communication interface configured to be connected to the external device 10, the processor 140 may identify whether the second communication interface 120 and the external device 10 are connected through the wired/wireless cable even if the configuration information of the modular display apparatus 1000 is not received from the external device through the second communication interface 120.

As another example, using a communication scheme according to a standard between the display apparatus 100 and the external device 10, any one of the second communication interface 120 and the third communication interface 160 may be connected to the external device 10, and the other may be connected to a source device.

The display interface 170 may connect the system driver and the display 130. For example, the display interface 170 may be a variety of types of wired communication interfaces, for example, V-by-one, HDMI cable, low voltage differential signals (LVDS) cable, digital visual interface (DVI) cable, d-subminiature (D-SUB) cable, video graphics array (VGA) cable, an optical cable, or various types of wireless communication interfaces known to one of ordinary skill in the art.

According to some embodiments, when the external device 10 transmits the content signal received from the source device to the display apparatus 100 through the second communication interface 120, the processor 140 may provide the content signal to the display 130 through the display interface 170.

In the above example, the modular display apparatus 1000 includes a plurality of display apparatuses 100-1 to 100-*n*. In other examples, the modular display apparatus 1000 may be composed of one display apparatus 100. The display apparatus 100 may operate independently.

Figure 6:
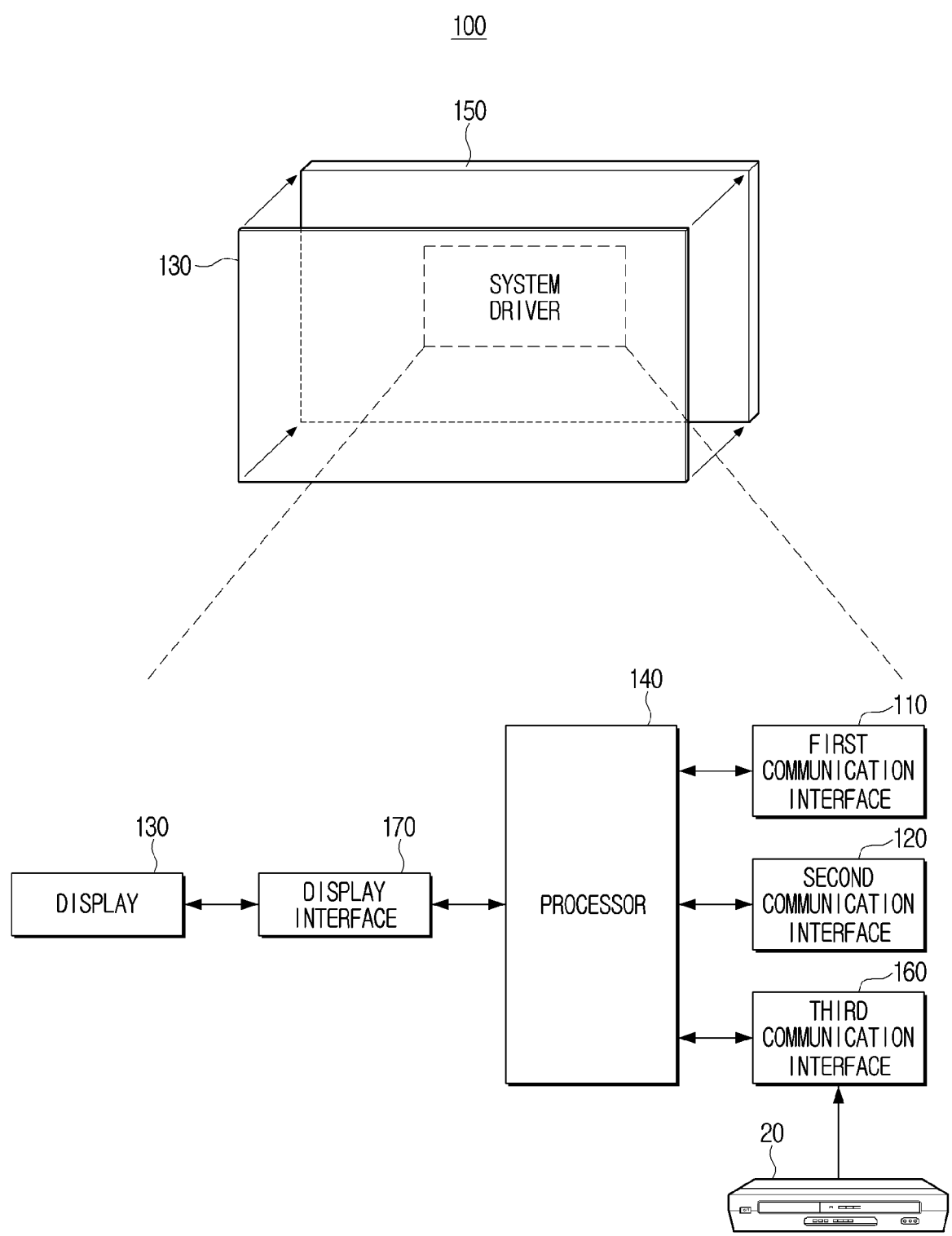
FIG. 6 is a diagram illustrating a display apparatus to communicate with a source device according to another embodiment.

FIG. 6 is a diagram illustrating a display apparatus to communicate with a source device according to an embodiment.

Referring to FIG. 6, the display apparatus 100 may operate as one independent device, and only one display apparatus 100 may be connected to the external device 10.

According to some embodiments, the display apparatus 100 may receive a content signal from the source device 20 through the third communication interface 160, and the processor 140 may control the display 130 to provide the received content signal.

In another example, if the source device 20 is connected to the external device 10, the external device 10 may transmit the content signal received from the source device 20 to the display apparatus 100, and the processor 140 may control the display 130 to provide the content signal received from the external device 10.

As an example, when the display apparatus 100 operates as one independent device, the display apparatus 100 may display the UI screen 1 to correspond to the screen size of the display 130 according to a control signal for displaying the UI screen 1 received from the remote control device 200.

Figure 7:
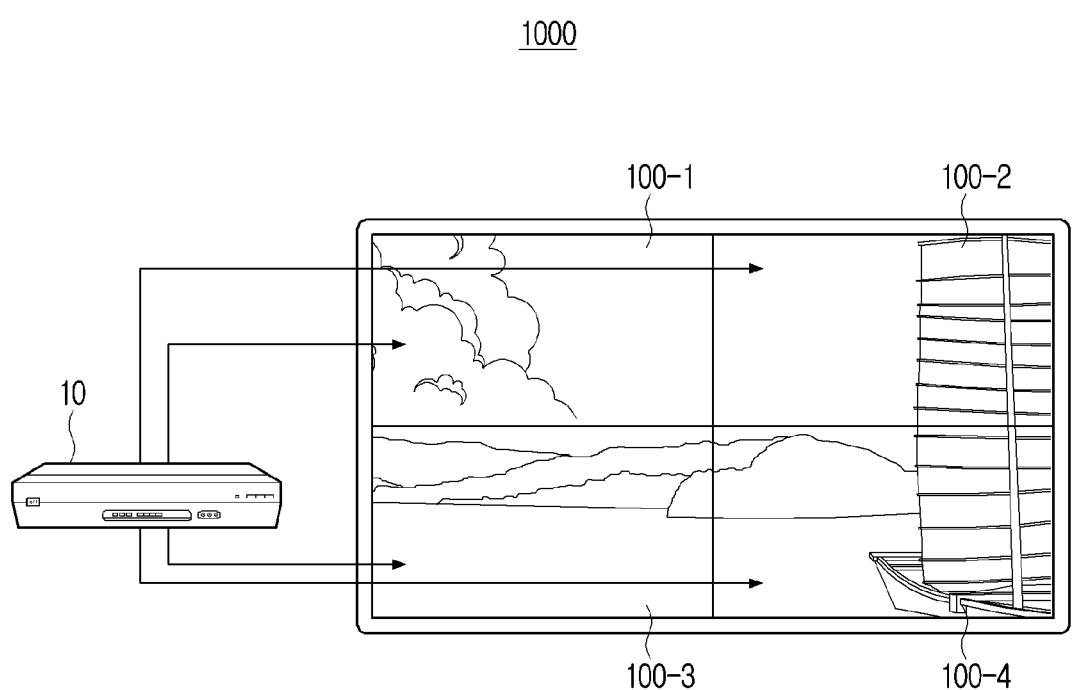
FIG. 7 is a diagram illustrating an external device according to an embodiment.

FIG. 7 is a diagram illustrating an external device according to an embodiment.

Referring to FIG. 7, the modular display apparatus 1000, according to some embodiments of the disclosure, may include the external device 10 in addition to a plurality of display apparatuses 100-1 to 100-*n*. The external device 10 may be distinguished from the plurality of display apparatuses 100-1 to 100-*n* and may control the operation and driving of the modular display apparatus 1000 composed of the plurality of display apparatuses 100-1 to 100-*n*. The external device 10 may be referred to as a control device, a control box, or any other type of external device known to one of ordinary skill in the art. For the convenience of description, these types of devices are referred to hereinafter as an external device 10.

The external device 10 may communicate with each of the display apparatus 100 and the other display apparatus 100', and transmit the content signal received from the source device 20 to the display apparatus 100 and the other display apparatus 100'.

The external device 10, according to some embodiments of the disclosure, may process the content signal received from the source device 20, UI screen 1, or any other received data, to correspond to the screen size of the modular display apparatus 1000 based on the configuration information of the modular display apparatus 1000 composed of a plurality of display apparatuses 100-1 to 100-*n*. The external device may subsequently transmit the same to each of the plurality of display apparatuses 100-1 to 100-*n*.

Each of the plurality of display apparatuses 100-1 to 100-*n* may include the first communication interface 110. Therefore, each of the plurality of display apparatuses 100-1 to 100-*n* may receive a control signal for displaying the UI screen 1 from the remote control device 200.

Accordingly, the configuration information of the modular display apparatus 1000 may include control information to activate only the first communication interface 110 provided in one display apparatus (e.g., the first display apparatus 100-1) among the plurality of display apparatuses 100-1 to 100-*n* and inactivate the first communication interface 110 provided in remaining display apparatuses 100-2 to 100-*n*.

According to some embodiments of the disclosure, when the first communication interface 110 of the first display apparatus 100-1 receives a control signal for displaying the UI screen 1 from the remote control device 200, the processor 140 of the first display apparatus 100-1 may identify whether the other display apparatus 100' is connected to the external device 10.

If the other display apparatus 100' is connected to the external device 10, the processor 140 may transmit the control signal to display the UI screen 1 to the external device 10.

When the control signal is received from the external device 10, the external device 10 may adjust the size of the UI screen 1 to correspond to the screen size of the modular display apparatus 1000 based on the configuration information. The external device 10 may transmit the UI screen 1 with the adjusted size to each of the plurality of display apparatuses 100-1 to 100-*n*.

The other display apparatus 100' may display a UI screen 1 (i.e., a size-adjusted UI screen 1) received from the external device 10 or a part of the UI screen 1.

Referring back to FIG. 2, the display apparatus 100, according to some embodiments, may further include a memory.

According to some embodiments, a memory may store data necessary for various embodiments. The memory may be implemented as a memory type embedded in the display apparatus 100 according to a data storage use, or a memory type detachable from the display apparatus 100.

For example, the data for driving the display apparatus 100 may be stored in a memory embedded in the display apparatus 100, and the data for expansion of the display apparatus 100 may be stored in a memory detachable from the display apparatus 100. A memory embedded in the display apparatus 100 may be a volatile memory such as, for example, and without limitation, a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive, a solid state drive (SSD), or any other memory known to one of ordinary skill in the art. When the memory is detachably mounted to the electronic apparatus 100, the memory may be implemented as, for example, and without limitation, a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or any other memory known to one of ordinary skill in the art.

According to some examples, the memory may store at least one instruction or a computer program including instructions to control the display apparatus 100.

The memory may prestore an OSD menu to adjust various setting values of the display apparatus 100.

The memory provided in the external device 10 may also pre-store the OSD menu (e.g., UI data) for adjusting each setting value of each of the plurality of display apparatuses 100-1, . . . , 100-n constituting the modular display apparatus 1000.

According to some embodiments of the disclosure, the processor 140 may identify whether the other display apparatus 100' is connected based on the configuration information of the modular display apparatus 1000 composed of the plurality of display apparatuses 100-1 to 100-n received from the external device 10 through the second communication interface 120, but is not limited thereto.

According to some embodiments of the disclosure, the processor 140 may identify whether a wired/wireless cable for communicating with the external device 10 or the other display apparatus 100' is connected to the second communication interface 120 or the third communication interface 160, and may identify whether the other display apparatus 100' is connected to the external device 10 based on the identification result.

According to some embodiments of the disclosure, the processor 140 may identify whether the display apparatus 100 is operated as one of the display apparatus among the modular display apparatus 1000 composed of plurality of display apparatuses 100-1 to 100-n rather than independently operating based on a user command received through a button, a microphone, or any other input mechanism provided in the remote control device 200 or the display apparatus 100. The user command may be a command to set the modular display apparatus 1000 (e.g., location, size of the plurality of display apparatuses 100-1 to 100-n constituting the modular display apparatus 1000, or the number of the plurality of display apparatuses 100-1 to 100-n) composed of plurality of display apparatuses 100-1 to 100-n.

FIG. 8 is a flowchart illustrating a method of controlling a display apparatus, according to an embodiment.

According to some embodiments of the disclosure, when a control signal for displaying a user interface (UI) screen is received, the control method of the display apparatus included in the modular display apparatus identifies whether the other display apparatus is connected to the external device based on the configuration information of the modular display apparatus received from the external device in operation S810. The external device may be external device 10.

When it is identified that the other display apparatus is connected to the external device, the control signal is transmitted to the external device in operation S820.

The UI screen processed by the external device according to the control signal is received from the external device in operation S830.

At least a portion of the received UI screen may be displayed in operation S840.

The UI screen received from the external device may be a UI screen processed so as to correspond to a size of a screen of the modular display apparatus including the display apparatus and the other display apparatus.

According to some embodiments, the UI screen may be an UI screen including an on screen display (OSD) menu to adjust a setting value of the plurality of display apparatuses constituting the modular display apparatus.

The control method according to some embodiments may further include, based on identifying that the other display is not connected to the external device, displaying a screen corresponding to the control signal.

The configuration information of the modular display apparatus may include location information of the display apparatus within the modular display apparatus, and the displaying in operation S840 may include displaying at least a part of the UI screen corresponding to the location information of the display apparatus out of the received UI screen.

The control method according to some embodiments of the disclosure may further include deactivating a communication interface for receiving a control signal transmitted by a remote control device on the basis of the configuration information of the modular display apparatus, and the displaying S840 may include displaying a UI screen received from the external device.

The UI screen may be processed by the external device as the other display apparatus transmits the control signal received from the remote control device to the external device.

The external device, according to some embodiments of the disclosure, may perform communication with each of the display apparatus and the other display apparatus, and transmit the content signal received from the source device to the display apparatus and the other display apparatus.

The various embodiments of the disclosure may be applied to any type of electronic device having a display, as well as an electronic device.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the electronic apparatus 100 according to the various embodiments described above when executed by the processor of the particular device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

In addition, while example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. A display apparatus included in a modular display apparatus composed of a plurality of display apparatuses, the display apparatus comprising:
    a first communication interface configured to communicate with a remote control device;
    a second communication interface configured to communicate with an external device;
    a display; and
    one or more processor configured to:
        based on a control signal for displaying a user interface (UI) screen being received through the first communication interface, identify whether another display apparatus of the plurality of display apparatuses is connected to the external device based on configuration information of the modular display apparatus received from the external device through the second communication interface,
        based on identifying that the other display apparatus is connected to the external device, transmit the control signal to the external device through the second communication interface,
        receive, from the external device through the second communication interface, the UI screen processed by the external device according to the control signal, and
        control the display to display at least a portion of the received UI screen.

2. The display apparatus of claim 1, wherein a combination of each display of each display apparatus of the plurality of display apparatuses in the modular display apparatus forms a composite modular screen, and
    wherein the UI screen received from the external device is processed so as to correspond to a size of the composite modular screen.

3. The display apparatus of claim 1, wherein the UI screen comprises an on screen display menu to adjust a setting value of the plurality of display apparatuses constituting the modular display apparatus.

4. The display apparatus of claim 1, wherein the one or more processor is further configured to, based on identifying that the other display apparatus is not connected to the external device, control the display to display an entire portion of the UI screen corresponding to the control signal.

5. The display apparatus of claim 1, wherein the configuration information of the modular display apparatus comprises location information of the display apparatus within the modular display apparatus, and
    wherein the one or more processor is further configured to control the display to display at least the portion of the UI screen corresponding to the location information of the display apparatus in the modular display apparatus.

6. The display apparatus of claim 1, wherein the one or more processor is further configured to, based on the first communication interface being inactivated based on the configuration information of the modular display apparatus, control the display to display the UI screen received from the external device through the second communication interface, and
    wherein the UI screen is processed by the external device as the other display apparatus transmits the control signal received from the remote control device to the external device.

7. The display apparatus of claim 1, wherein the one or more processor is further configured to receive from the external device a content signal received by the other display apparatus from a source device.

8. A modular display apparatus comprising:
    a plurality of display apparatuses; and
    a control device configured to communicate with each of the plurality of display apparatuses,
    wherein at least one display apparatus of the plurality of display apparatuses is configured to transmit a control signal received from a remote control device to the control device, and
    wherein the control device is further configured to:
    based on a control signal to display a user interface (UI) screen being received from the at least one display apparatus, process UI data corresponding to the control signal based on configuration information of the modular display apparatus and obtain the processed UI screen, and
    transmit the processed UI screen to each display apparatus of the plurality of display apparatuses.

9. The modular display apparatus of claim 8, wherein a combination of each display of each display apparatus of the plurality of display apparatuses in the modular display apparatus forms a composite modular screen, and
    wherein the UI screen received from the control device is processed to correspond to a screen size of the composite modular screen.

10. The modular display apparatus of claim 8, wherein the UI screen comprises an on screen display menu to adjust a setting value of the plurality of display apparatuses constituting the modular display apparatus.

11. The modular display apparatus of claim 8, wherein the UI screen is processed such that each display apparatus of the plurality of display apparatuses displays a different portion of the UI screen.

12. The modular display apparatus of claim 11, wherein the configuration information comprises location information of each display apparatus of the plurality of display apparatuses, and
    wherein the different portion of the UI screen displayed in each display apparatus of the plurality of display apparatuses is based on the location information.

13. The modular display apparatus of claim 8, wherein the control device is further configured to communicate independently with each display apparatus of the plurality of display apparatuses.

14. The modular display apparatus of claim 13, wherein the control device is further configured to transmit a content signal received from a source device to each display apparatus of the plurality of display apparatuses.

15. A control method of a display apparatus included in a modular display apparatus composed of a plurality of display apparatuses, the method comprising:
- based on a control signal for displaying a user interface (UI) screen being received through a first communication interface of the display apparatus, identifying whether another display apparatus is connected to an external device based on configuration information of the modular display apparatus received from the external device through a second communication interface of the display apparatus;
- based on identifying that the other display apparatus is connected to the external device, transmitting the control signal to the external device through the second communication interface;
- receiving, from the external device through the second communication interface, the UI screen processed by the external device according to the control signal; and
- displaying, by a display of the display apparatus, at least a portion of the received UI screen.

16. The method of claim 15, wherein a combination of each display of each display apparatus of the plurality of display apparatuses in the modular display apparatus forms a composite modular screen, and
wherein the UI screen received from the external device is processed so as to correspond to a size of the composite modular screen.

17. The method of claim 15, wherein the UI screen comprises an on screen display menu to adjust a setting value of the plurality of display apparatuses constituting the modular display apparatus.

18. The method of claim 15, further comprising:
- based on identifying that the other display apparatus is not connected to the external device, displaying an entire portion of the UI screen corresponding to the control signal.

19. The method of claim 15, wherein the configuration information of the modular display apparatus comprises location information of the display apparatus within the modular display apparatus, and
wherein the displaying comprises displaying at least a portion of the UI screen corresponding to the location information of the display apparatus in the modular display apparatus.

20. The method of claim 15, further comprising:
- deactivating, based on the configuration information of the modular display apparatus, the first communication interface such that the control signal transmitted by a remote control device is not received through the first communication interface,
wherein the displaying comprises displaying the UI screen received from the external device, and
wherein the UI screen is processed by the external device as the other display apparatus transmits the control.

* * * * *